(No Model.)

A. SCHOTT.
CULTIVATOR.

No. 283,926. Patented Aug. 28, 1883.

Witnesses.
T. P. Thompson
Ernst A. Weishaar

Inventor:
Anton Schott

UNITED STATES PATENT OFFICE.

ANTON SCHOTT, OF FRANKLIN GROVE, ILLINOIS.

CULTIVATOR.

SPECIFICATION forming part of Letters Patent No. 283,926, dated August 28, 1883.

Application filed April 30, 1883. (No model.)

*To all whom it may concern:*

Be it known that I, ANTON SCHOTT, a citizen of the United States, residing at Franklin Grove, in the county of Lee and State of Illinois, have invented a new and useful Cultivator, of which the following is a specification.

The main object of my invention is to provide an improved cultivator to prepare the ground that has previously been used for corn for the reception of oats or other small grain; and to this end the invention consists in the construction and arrangement of parts, as hereinafter described. My said invention may also be used as a potato-digger by a slight modification, which may be made without departing from the essential principles of the invention, as hereinafter more fully described.

Reference is to be had to the accompanying drawings, forming part of this specification, in which similar letters of reference indicate corresponding parts in the several figures.

Figure 1:
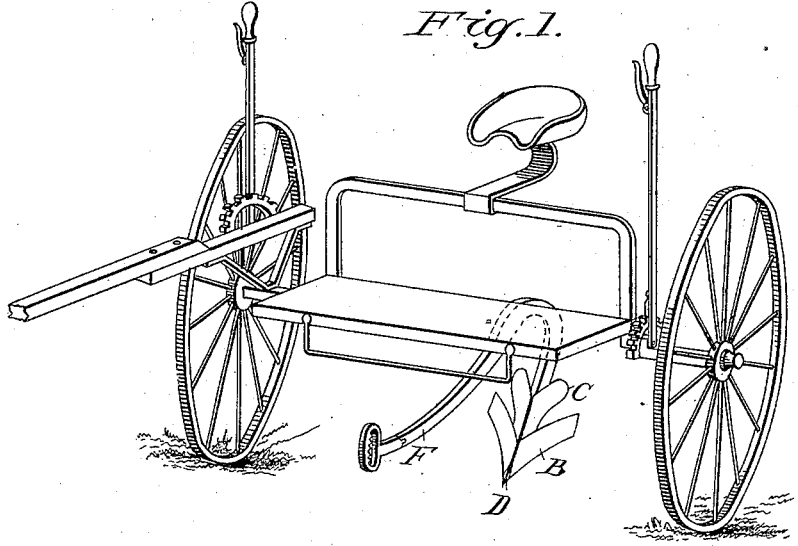
Figure 2:
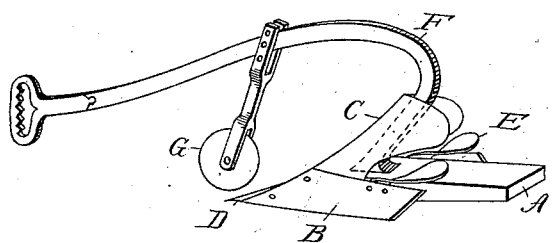
Figure 3:
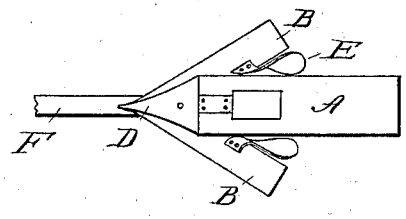
Figure 4:
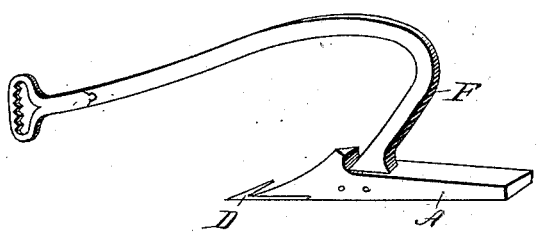
Figure 5:
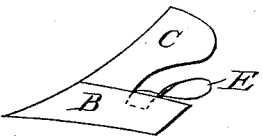

Figure 1 is a perspective view of my cultivator suspended from an ordinary sulky. Fig. 2 is a side elevation of my invention with rolling colter; Fig. 3, a bottom plan view. Fig. 4 is a side elevation of the shoe or heel, point, and beam. Fig. 5 is a side elevation of the share, mold-board, and flange.

A represents the shoe or heel, which is made of iron or other approved material, and serves to hold and to keep the point D, shares B B, and mold-boards C C in their respective and relative position, and also to steady the cultivator when in use.

E represents one of the flanges which are riveted or otherwise secured to the share B. Said flange consists of a flat piece of metal twisted about one-quarter around, so as to turn the dirt over and toward the shoe A, and by the proper adjustment of said flange or flanges the ground may be perfectly leveled.

F represents an ordinary curved iron plow-beam, and G the common rolling colter.

The pick-point D is made of steel and securely fastened to the bottom of the shoe A, as shown in Fig. 3, and it extends forward and upward for the protection of the joint of the two shares B B, where they join and form a sharp edge in front. The mold-boards C C are cut away at their rear edges, as shown in drawings, for the purpose of allowing the dirt to drop down on the flanges E E.

My improved cultivator is used in combination with an ordinary sulky—such as is used for riding-plows and other agricultural implements—and arranged as shown in Fig. 1. When used to cultivate old corn-fields for oats or other small grain in the spring of the year, it is adjusted so as to split the row in the middle with the aid of the colter. The shares B B and mold-boards C C divide and spread the row in two equal parts to the right and left. The dirt which is raised above said shares and onto the mold-boards is dropped onto the flanges E E, and by them turned over and leveled. I generally use but one flange on each share, but find it occasionally to advantage to use two or more on each, and have them secured to the shares by such means that their relative position can be changed to throw the dirt closer or farther from the shoe A, as the necessity may suggest, to make the ground perfectly level. By using the common adjusting device for riding-plows I can adjust my cultivator so that by going over the ground once it will pulverize and level the ground perfectly. The grain may be sown before or after the cultivator has performed its work.

In using my invention as a potato-digger the rolling colter should be removed, as shown in Fig. 1, and the point let down low enough to go under the potatoes. The shares B B will raise the dirt and potatoes. The mold-boards C C and flanges E E will spread it so that the potatoes will be left exposed on top of the ground, from where they may very readily be picked up by hand.

The advantages of my invention, answering the double purpose of cultivator and potato-digger, are very apparent, as well as the simplicity of its construction and its adaptability of being used in combination with the ordinary carriage, plow-beam, and rolling colter, which most every farmer possesses.

Having thus fully described my invention, what I claim as new, and desire to secure by Letters Patent, is—

The two mold-boards C C, having their rear edges cut away, in combination with the shares B B and flanges E E, substantially as shown, and for the purposes set forth.

ANTON SCHOTT.

Witnesses:
T. P. THOMPSON,
ERNST A. WEISHAAR.